UNITED STATES PATENT OFFICE.

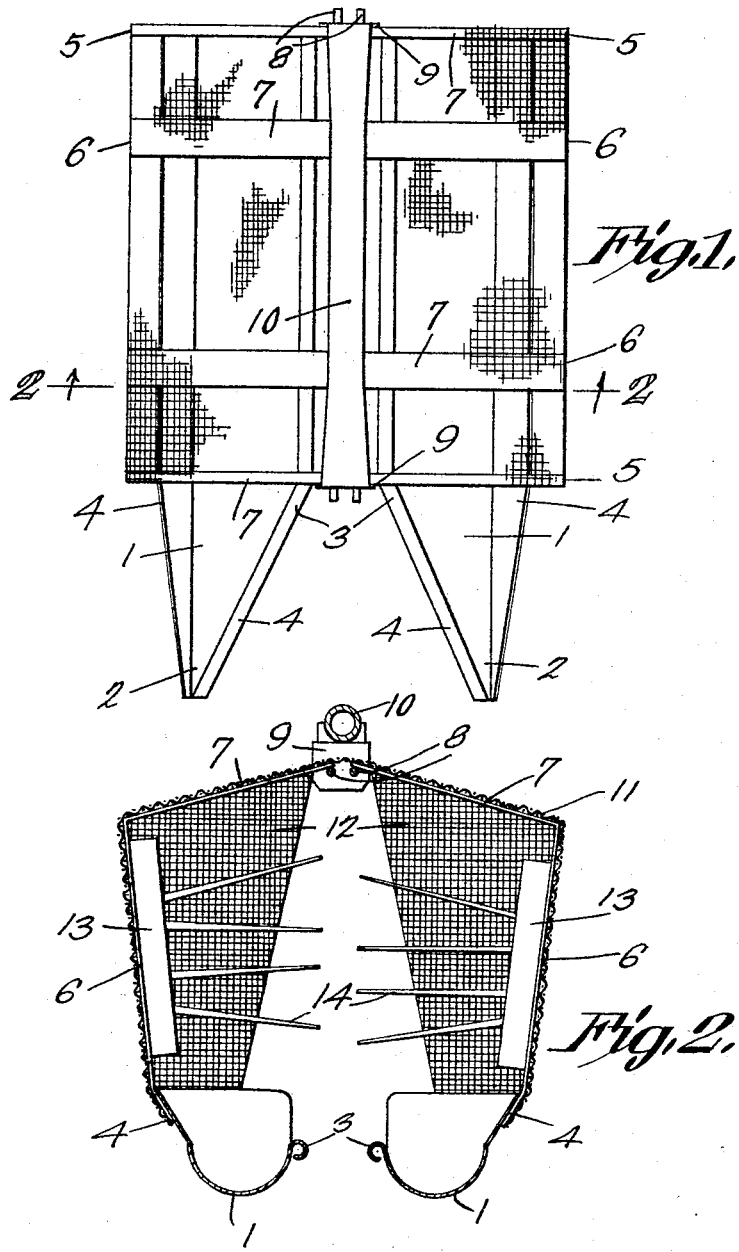

WALTER E. FRADY, OF GRENADA, MISSISSIPPI.

BOLL-WEEVIL COLLECTOR.

1,220,213.  Specification of Letters Patent.  Patented Mar. 27, 1917.

Application filed October 26, 1916. Serial No. 127,886.

*To all whom it may concern:*

Be it known that I, WALTER E. FRADY, a citizen of the United States, residing at Grenada, in the county of Grenada and State of Mississippi, have invented a new and useful Boll-Weevil Collector, of which the following is a specification.

The present invention appertains to insect collectors and traps, and aims to provide a novel and improved device for collecting or trapping boll weevil and other insects, whereby they can be exterminated.

It is the object of the invention to provide a boll weevil collector of novel and improved construction which can be moved astride a row of cotton plants, for shaking the boll weevil therefrom and collecting them.

It is also the object of the invention to provide a device of the nature indicated which is extremely simple and inexpensive in construction, as well as being thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the boll weevil collector.

Fig. 2 is a vertical cross section taken on the line 2—2 of Fig. 1.

In carrying out the invention, there is provided a pair of spaced parallel longitudinal troughs 1 concaved transversely and having their forward ends pointed, as at 2, in order that the troughs can be drawn over the ground between the rows of cotton plants. The inner edges of the troughs 1, which are constructed of sheet metal or other suitable material, are provided with beads 3, the forward terminals of which diverge forwardly to direct the cotton plants between the troughs. The troughs are elongated and their remote sides 4 are inclined on divergent lines, as seen in Fig. 2, the ends of the troughs being closed, so that oil or other insect destroying solution can be contained within the troughs into which the insects drop.

Upwardly projecting bars 5 and 6 are attached to the remote sides of the troughs, the bars 5 being at the ends and the bars 6 in between them. The upper ends of the bars have portions 7 bent angularly inward toward one another in an upwardly converging position. The bars 5 and 6 are arranged in pairs at opposite sides, and provide resilient arches connecting the troughs and adapted to move over the cotton plants. The ends of the portions 7 which extend angularly inward are soldered or otherwise secured upon a pair of longitudinal rods 8 disposed side by side above the slot between the troughs 1, and the terminals of the bars 8 extend loosely through the downturned ends 9 of a longitudinal yoke 10. The rods 8 can oscillate, whereby the two halves of the arches can swing toward and away from one another to permit of the movement of the troughs 1 toward and away from one another, as they are moved along the rows of plants. The hood is completed by a sheet 11 of wire mesh or other reticulated material secured upon the arches and extending from the outer side 4 of one trough to the outer side of the other trough over the arches to confine the insects within the hood. The rear ends of the two sections of the hood are closed by meshed wire or reticulated ends 12 between the rear ends of the troughs 1 and rear bars 5, to prevent the insects from escaping from the rear of the hood, although the ends 12 are spaced apart sufficiently to permit the plants to pass therebetween.

Vertical blocks 13 are secured to the inner sides of the bars 6, and are provided with inwardly projecting diverging arms 14. The arms of each set are located in a vertical plane and project toward the opposite set of arms, and as the device is moved over the plants, the arms 14 will thoroughly shake or agitate the plants to knock the boll weevil therefrom which will drop into the troughs 1 to be exterminated. The hood or covering prevents the insects from escaping or being knocked away from the troughs 1. It will be noted that the arches carrying the covering are jointed at their upper intermediate portions, whereby the limbs or bars 5 and 6 of the arches can swing toward or away from one another.

The device is adapted to be pulled or pushed about in any suitable manner, such as by draft means connected to the forward ends of the troughs. The troughs are adapted to slide in furrows at the opposite sides of the row of plants to guide the troughs.

It is obvious that the troughs can be so pushed or pulled over the ground as to prevent them from separating an undesired distance, and in fact the device can be so moved over the ground that there is a tendency by the pushing or pulling movement, to move the troughs toward one another, thereby keeping the troughs adjacent to the plants. If necessary, suitable means can be employed for preventing the undue separation of the troughs.

Having thus described the invention, what is claimed as new is:—

An insect collector embodying a pair of longitudinal troughs, arches embodying upwardly projecting members secured to the remote sides of the troughs and having inwardly extending portions at their upper ends, longitudinal rods upon which said portions are secured and disposed side by side, a longitudinal yoke having depending ends through which said rods are engaged for oscillatory movement, and a covering upon said arches.

In testimony that I claim the foregoing as my own, I have hereto affixed my signature in the presence of two witnesses.

WALTER E. FRADY.

Witnesses:
F. B. McKee,
W. B. Barnes.